W. E. HANCOCK.
OIL WELL MECHANISM.
APPLICATION FILED NOV. 30, 1920.
1,384,525.
Patented July 12, 1921.
2 SHEETS—SHEET 1.
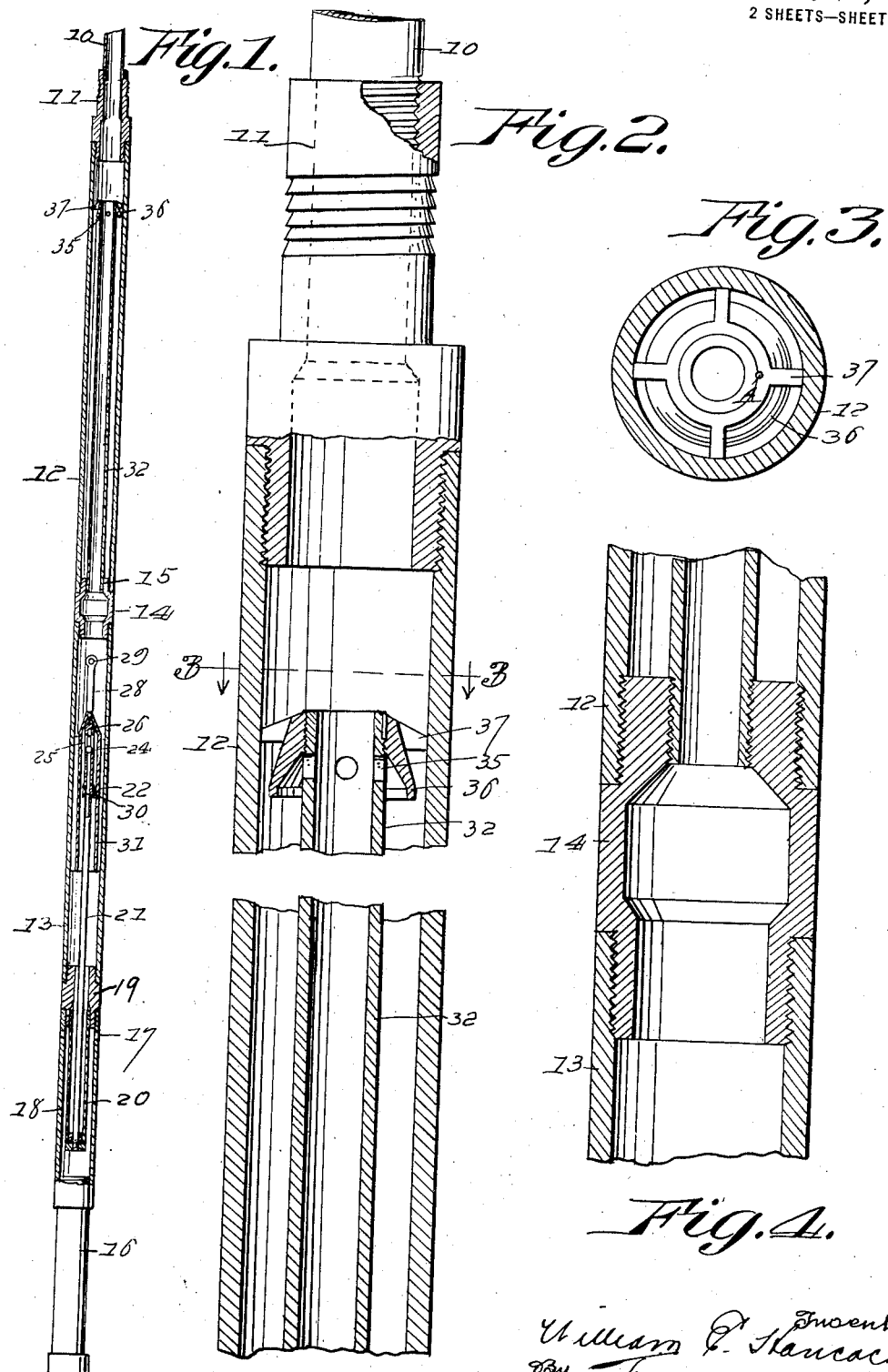

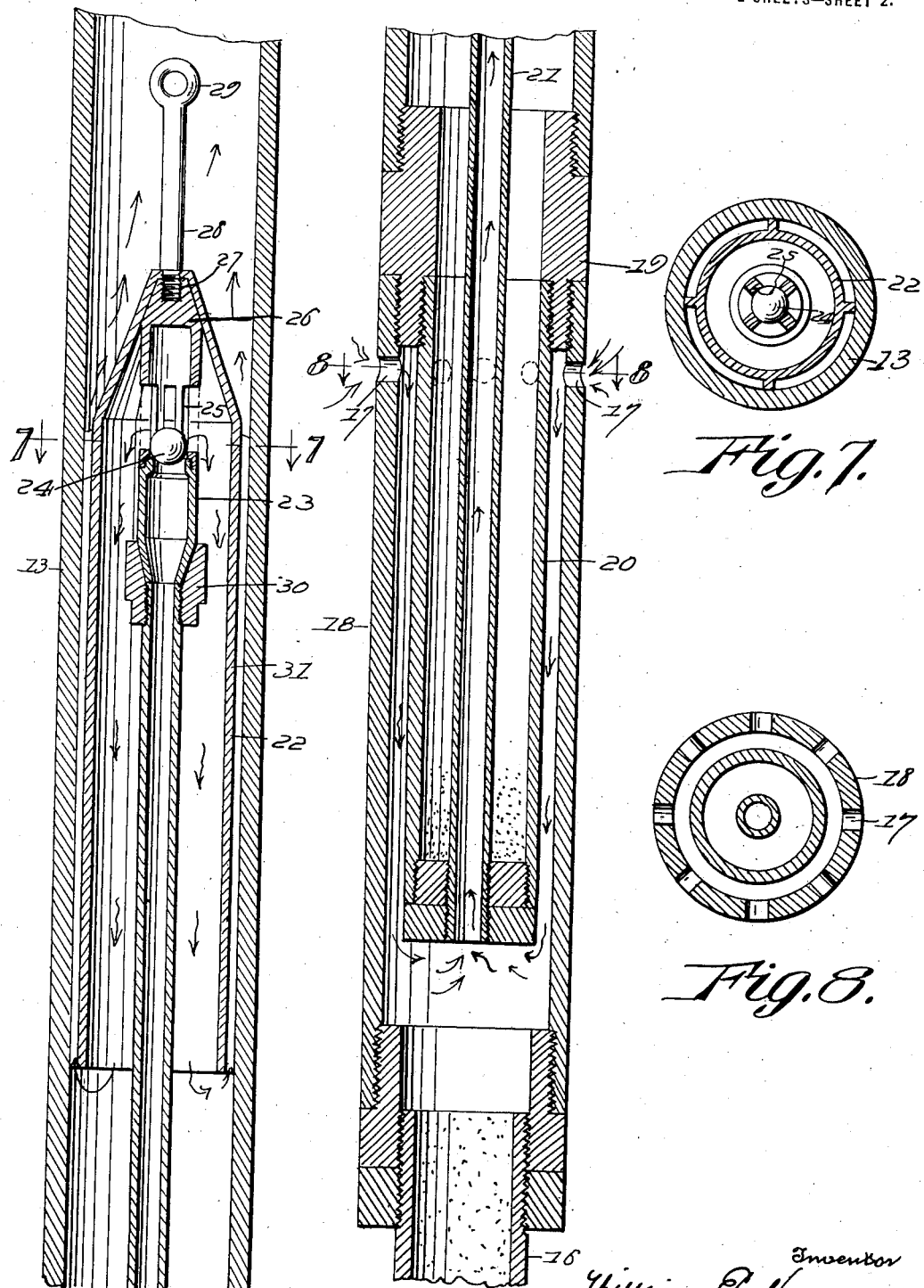

UNITED STATES PATENT OFFICE.

WILLIAM E. HANCOCK, OF TULSA, OKLAHOMA.

OIL-WELL MECHANISM.

1,384,525.　　　　Specification of Letters Patent.　　Patented July 12, 1921.

Application filed November 30, 1920. Serial No. 427,331.

*To all whom it may concern:*

Be it known that I, WILLIAM E. HANCOCK, a citizen of the United States of America, and resident of Tulsa, in the county of Tulsa and State of Oklahoma, have invented certain new and useful Improvements in Oil-Well Mechanism, of which the following is a specification.

This invention relates to oil well mechanism and includes features of invention constituting an improvement on the invention forming the subject matter of my application filed September 17, 1920, Serial Number 410,847.

The objects of the invention are to arrest and collect sand or other foreign substances accompanying oil in its flow from wells, and the said invention is intended to separate substances that are heavier than oil from the said oil in order that the oil may flow through the pumps free of sand and grit which would impair the utility of the working parts of the pump.

A further object of this invention is to produce a piping in such relation to a casing as to form passages between them for the flow of oil, means being provided whereby the oil is partially arrested and deflected to more fully free the said oil of the foreign substances.

A still further object of this invention is to produce baffles or deflecting elements which are relatively long and in which the oil has a down flow so that the foreign substances will attain a certain velocity which will not be overcome by suction influencing the oil to rise; it being understood that by the time the oil is under the influence of the suction, the foreign substances will be dissociated from the oil and such foreign substances will then gravitate to collectors, the oil going free of these injurious foreign substances.

A still further object of this invention is to produce a section tubing having the baffle elements therein with means for engaging a hoisting device whereby parts of the tubing or collectors may be withdrawn from the well.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1 illustrates a section view of a pipe having guards associated therewith;

Fig. 2 illustrates an enlarged detailed sectional view of a fragment of the device;

Fig. 3 illustrates a sectional view on the line 3—3 of Fig. 2;

Fig. 4 illustrates an enlarged detailed sectional view of the joint between the sections of the pipe;

Fig. 5 illustrates an enlarged detailed sectional view of the lower collector;

Fig. 6 illustrates an enlarged detailed sectional view of the lowermost section of the collector;

Fig. 7 illustrates a sectional view on a line corresponding with the line 7—7 of Fig. 5; and Fig. 8 illustrates a sectional view on a line corresponding with the line 8—8 of Fig. 5.

In these drawings 10 denotes the lower end of a pump line having a coupling 11 by which the guard or collar is secured to the lower end of said pump line, and it is to be understood that said pump line is to be used in connection with any pump equipment, which latter is not shown, as one skilled in the art will understand the application of the invention to such standard equipment.

The guard comprises, in the present embodiment of the invention, lengths of piping 12 and 13 secured together by a coupling 14, the said coupling having a threaded upper nipple 15. The lower pipe section has a coupling 16 and it is hollow so that it acts as a depository for the heavier sands or gravel which enter with the oil through the ports 17 formed in the lowermost pipe section 18. The sections 13 and 18 are connected by a coupling 19 and the coupling 19 has a depending tube 20 forming a guard around which the oil travels in order that the said oil will enter the end of the guard and then pass upward through the tubular sections, as will presently appear. An intake pipe 21 extends through a head of the depending tube 20, and it operates as a support for the deflector hood 22 which hood is of less diameter than the tubing so that there is an annular channel formed between the said hood and tubing. The pipe 21 has a valve seat 23 at its upper end engaged by a valve 24, and the said valve 24 is within a cage 25 coupled to the valve seat. The said cage terminates in a head 26, having a threaded aperture 27 therein, which receives the threaded shank 28, and the said threaded shank terminates in an eye 29, adapted to receive a hoisting tool in order that the deflector hood, and ball and cage may be withdrawn from the tubing.

It will be seen that the valve seat and intake pipe 21 are connected together by the coupling 30 so that the parts of the device may be disassembled for the purposes of renewing those which become impaired in any way. The head of the valve cage acts as a support for a depending hood 31, which is of a diameter less than the diameter of the tube, thereby forming an annular channel through which oil may circulate in its passage up the tubing. The hood acts to arrest the upward movement of the oil and foreign substances, and therefore, they are caused to gravitate the full length of the hood prior to the time that the oil is under the influence of the suction of the pumping mechanism, and therefore, a great quantity of the foreign substances dissociates itself from the oil at the lower end of the hood and gravitates to a collector which is formed by the coupling 19 and the tubing which is connected to the said coupling.

The partially freed oil therefore reaches the coupling 14 and is then introduced into the working barrel 32, in which the suckers and sucker rods operate. The hood 36 has lugs 37 which project into engagement with the inner surface of the tubing 12, and therefore, the parts are held in proper spaced relation to each other while at the same time affording passage for the circulation of oil which is drawn through the pump line in the usual manner.

It will be seen from an inspection of the drawing that when the pump is operated, oil will enter the ports 17 to the interior of the tubing and will enter the lower end of the pipe 21 following up said pipe to the valve cage where it will be discharged into the deflector, the oil following the course of the darts in Fig. 5, whereas the heavier foreign substances will fall and be collected as heretofore stated. The oil then will pass up the working barrel 32 past the suckers or pistons and it will then pass upwardly and be discharged in the usual way.

During the normal pumping operation, the oil will flow out through the end of the barrel or pipe 32 and on cessation of the pumping operation, the oil that is above the barrel will settle back into the barrel and tubing and circulate through the ports 35 and in the space around the exterior of the hood 36 until a normal level is reached.

The hood or deflector 36 is shown as threaded on the tubing and preferably a key A, is employed for preventing accidental rotation of the said deflector, it being understood that the key may be removed when the parts are to be disassembled.

The coupling 19 has an internally and externally threaded flange or nipple which threads are engaged respectively by the depending tube 20, and the pipe section 18.

I claim—

1. In an equipment for oil wells, a sectional tubing, couplings between the sections of the tubing, an oil intake pipe extending through the lowermost coupling, means for protecting the end of said intake pipe and the direct flow of oil thereto, a valve seat on the upper end of the intake pipe, a valve coacting therewith, means for holding the valve in operative relation to its seat, a deflector extending downwardly from a point above the valve seat supported in spaced relation to the tubing whereby an annular chamber is formed between the deflector and the tubing, a working barrel above the said deflector having ports in its side, and a means secured to the upper end of the working barrel and having lugs engaging the interior wall of the tubing for holding the discharge pipe in spaced relation to the tubing.

2. In an oil well equipment, a tubing having a settling chamber at its bottom, the said tubing being formed in sections with interposed couplings, an oil intake pipe extending through the lowermost coupling, a depending tube operating as a guard for the lower end of the intake pipe, a valve for controlling the upper end of the intake pipe, a deflecting hood extending downwardly in the tubing and supported in spaced relation to the inner wall of the tubing, a shank having an eye, the said shank being connected to the support for the hood, a working barrel above the intake pipe, means for supporting the working barrel in spaced relation to the tubing, the said working barrel having discharge ports in its side, a deflector having an aperture therein secured on the upper end of the working barrel and lugs on the deflector for holding it in spaced relation to the tubing.

3. In an oil well equipment, a sectional tubing, couplings for the sections of the tubing, a settling chamber below the lowermost coupling, a depending tube between the lowermost coupling and the settling chamber, the said tubing having oil ingress ports below the lowermost coupling near the upper end of the depending tube, an intake pipe extending through the depending tube and through the coupling, a valve seat and cage on the upper end of the intake pipe, a shank with an eye connected to the valve cage, a depending hood supported on the valve cage and held thereon by the shank, the said depending hood being of less diameter than the tubing, a working barrel connected to a coupling above the valve and communicating with a section of the tubing therebelow for discharging oil, a deflector on the upper end of the working barrel, the said working barrel having ports in its sides discharging against the deflector, and means for holding the deflector in spaced relation to the inner wall of the tubing.

4. In an oil well equipment, a tubing, an intake pipe through which oil is circulated, a valve for controlling the intake pipe, a hood supported above the valve and extending downwardly in spaced relation to the inner wall of the casing, means for arresting foreign substances below the depending hood, a barrel thereabove having ports in its sides near the upper end, a deflector secured to the upper end of the barrel and having lugs engaging the inner surface of the tubing for holding the parts in spaced relation thereto, and a sand arresting floor element below the said deflector.

WILLIAM E. HANCOCK.